United States Patent
Mikami et al.

(10) Patent No.: US 9,359,498 B2
(45) Date of Patent: Jun. 7, 2016

(54) AIRBAG HOUSING COVER

(71) Applicant: MITSUBISHI CHEMICAL CORPORATION, Tokyo (JP)

(72) Inventors: Junya Mikami, Mie (JP); Naomasa Hatoyama, Mie (JP)

(73) Assignee: MITSUBISHI CHEMICAL CORPORATION, Tokyo (JP)

(*) Notice: Subject to any disclaimer, the term of this patent is extended or adjusted under 35 U.S.C. 154(b) by 0 days.

(21) Appl. No.: 14/662,978

(22) Filed: Mar. 19, 2015

(65) Prior Publication Data

US 2015/0191590 A1 Jul. 9, 2015

Related U.S. Application Data

(63) Continuation of application No. PCT/JP2013/075184, filed on Sep. 18, 2013.

(30) Foreign Application Priority Data

Sep. 19, 2012 (JP) .................................. 2012-206110

(51) Int. Cl.
| | |
|---|---|
| B60R 21/215 | (2011.01) |
| C08L 23/10 | (2006.01) |
| C08L 53/00 | (2006.01) |
| C08L 23/08 | (2006.01) |
| C08L 23/16 | (2006.01) |

(52) U.S. Cl.
CPC .............. *C08L 53/00* (2013.01); *B60R 21/215* (2013.01); *C08L 23/10* (2013.01); *C08L 23/16* (2013.01); *C08L 2201/08* (2013.01); *C08L 2205/025* (2013.01); *C08L 2205/03* (2013.01); *C08L 2207/04* (2013.01)

(58) Field of Classification Search
None
See application file for complete search history.

(56) References Cited

U.S. PATENT DOCUMENTS

| 5,358,986 A | 10/1994 | Onofusa et al. |
| 5,803,489 A | 9/1998 | Nusshor |
| 5,968,381 A | 10/1999 | Nusshor |
| 2008/0234435 A1 | 9/2008 | Chang et al. |
| 2008/0249213 A1 | 10/2008 | Park et al. |
| 2009/0137708 A1 | 5/2009 | Kim et al. |
| 2011/0015333 A1 | 1/2011 | Fujiwara et al. |

FOREIGN PATENT DOCUMENTS

| CN | 101137714 | 3/2008 |
| CN | 101445639 | 6/2009 |
| CN | 101845194 | 9/2010 |
| CN | 101970573 | 2/2011 |
| DE | 10 2007 062 870 A1 | 5/2009 |
| EP | 0 779 185 | 6/1997 |
| JP | 5-38996 | 2/1993 |
| JP | 10-265628 | 10/1998 |
| JP | 2000-096752 | 4/2000 |
| JP | 2000-324901 | 11/2000 |
| JP | 2002-194088 | 7/2002 |
| JP | 2004-204057 | 7/2004 |
| JP | 2007-529617 | 10/2007 |
| JP | 2008-045037 | 2/2008 |
| JP | 2008-537563 | 9/2008 |
| JP | 2008-543978 | 12/2008 |
| WO | 2006/102154 | 9/2006 |

OTHER PUBLICATIONS

International Search Report issued Dec. 24, 2013, in PCT/JP2013/075184 filed Sep. 18, 2013.
Extended European Search Report issued May 29, 2015 in Patent Application No. 13838638.8.
Office Action issued Mar. 3, 2016, in Chinese Patent Application No. 201380048551.9, with English Translation.

*Primary Examiner* — Jeffrey Mullis

(74) *Attorney, Agent, or Firm* — Oblon, McClelland, Maier & Neustadt, L.L.P.

(57) ABSTRACT

The present invention relates to an airbag housing cover containing a thermoplastic elastomer composition which contains the following components (A) and (B) and contains from 10 to 300 parts by weight of the component (B) per 100 parts by weight of the component (A) and in which the melt flow rate at a measurement temperature of 230° C. and a measurement load of 21.18 N is from 5 to 50 g/10 min:

Component (A): a polypropylene-based resin

Component (B): an olefin-based block copolymer containing a polymer block composed of ethylene and an ethylene α-olefin copolymer block.

15 Claims, No Drawings

# AIRBAG HOUSING COVER

TECHNICAL FIELD

The present invention relates to an airbag housing cover excellent in the low-temperature impact resistance, high-temperature strength, etc.

BACKGROUND ART

An automotive airbag system is a system for protecting a driver or a passenger at the time of collision of an automobile, etc. and is composed of a device for sensing an impact upon collision and an airbag device. The airbag device is mounted on a steering wheel, an instrument panel ahead of a passenger seat, driver and passenger seats, front and side pillars, etc.

With respect to an airbag housing cover in an airbag device, there is a fear that at the time of inflation of an airbag, broken pieces resulting from collapse of a cover housing the airbag may be scattered or the cover may fly apart due to fracture of the cover attachment part. Therefore, for the purpose of preventing the cover from abnormal collapse and scattering, various proposals have been made in terms of the structure or material thereof.

As the material of the airbag housing cover, for example, a material composed of a hydrogenated styrene-conjugated diene block copolymer, a plasticizer for rubber, an olefin-based resin and additives has been proposed in Patent Document 1. In addition, a material composed of a propylene-based resin, an ethylene-α-olefin copolymer and a styrene-based elastomer has been proposed in Patent Documents 2 to 4, and a material composed of an olefin-based elastomer, a propylene-based resin and an ethylene-α-olefin copolymer has been proposed in Patent Document 5. Furthermore, a material composed of a propylene-based resin produced by multistage polymerization and an ethylene-propylene-5-ethylidene-2-norbornene copolymer rubber has been proposed in Patent Document 6.

CITATION LIST

Patent Document

Patent Document 1: JP-A-5-38996 (the term "JP-A" as used herein means an "unexamined published Japanese patent application")
Patent Document 2: JP-A-10-265628
Patent Document 3: JP-A-2000-096752
Patent Document 4: JP-A-2000-324901
Patent Document 5: JP-A-2002-194088
Patent Document 6: JP-A-2008-45037

SUMMARY OF INVENTION

Technical Problem

The recent trend for a luxury automobile and a soft instrument panel creates a concern that an airbag housing cover and an instrument panel may experience a trouble of deformation in a deployment test at high temperatures or an airbag housing cover for passenger seat may be damaged in a low temperature region due to increased airbag deployment force. To eliminate such a concern, as regards the airbag housing cover, from the standpoint of, for example, safety improvement, design latitude and cost reduction without involving a process for insert molding a metal plate or a nylon gray fabric, it is required to develop a material enhanced in the high-temperature strength and low-temperature impact resistance for use in forming an airbag housing cover, particularly, an airbag housing cover for passenger seat. However, those conventional materials for an airbag housing cover described in Patent Documents 1 to 6 are insufficient in the high-temperature strength or low-temperature impact resistance. Under these circumstances, an object of the present invention is to provide an airbag housing cover excellent in the high-temperature strength and low-temperature impact resistance.

Solution to Problem

As a result of intensive studies to attain the object above, the present inventors have found that an airbag housing cover composed of a thermoplastic elastomer composition containing a polypropylene-based resin and a specific amount of a specific ethylene α-olefin copolymer is excellent in the low-temperature impact resistance and high-temperature strength. The present invention has been accomplished based on this finding. That is, the gist of the present invention resides in the following [1] to [11].

[1] An airbag housing cover containing a thermoplastic elastomer composition which contains the following components (A) and (B) and contains from 10 to 300 parts by weight of the component (B) per 100 parts by weight of the component (A) and in which the melt flow rate at a measurement temperature of 230° C. and a measurement load of 21.18 N is from 5 to 50 g/10 min:
   Component (A): a polypropylene-based resin
   Component (B): an olefin-based block copolymer containing a polymer block composed of ethylene and an ethylene α-olefin copolymer block.
[2] The airbag housing cover as described in the above [1], wherein said component (B) is an olefin-based block copolymer having a crystal melting peak at 110 to 125° C. and the crystal melting heat quantity at the peak is from 20 to 60 J/g.
[3] The airbag housing cover as described in the above [1] or [2], wherein the carbon number of the α-olefin in the ethylene α-olefin copolymer block of said component (B) is from 4 to 8.
[4] The airbag housing cover as described in any one of the above [1] to [3], wherein said component (B) is an olefin-based block copolymer containing a polymer block composed of ethylene and an ethylene-1-octene copolymer block.
[5] The airbag housing cover as described in any one of the above [1] to [4], wherein said component (A) is a polypropylene block copolymer obtained by polymerizing a propylene homopolymer in a first step and subsequently polymerizing a propylene-ethylene copolymer in a second step.
[6] The airbag housing cover as described in any one of the above [1] to [5], wherein the melt flow rate (measurement temperature: 230° C., measurement load: 21.18 N) of said component (A) is from 10 to 150 g/10 min.
[7] The airbag housing cover described in any one of the above [2] to [6], which further contains the following component (C) and contains from 10 to 300 parts by weight of the component (C) per 100 parts by weight of said component (A):
   Component (C): an amorphous ethylene α-olefin copolymer whose crystal melting heat quantity at 110 to 125° C. is less than 20 J/g.
[8] The airbag housing cover as described in the above [7], wherein the melt flow rate (measurement temperature: 230° C., measurement load: 21.18 N) of said component (A) is from 10 to 100 g/10 min and the melt flow rate (measurement temperature: 190° C., measurement load: 21.18 N) of said component (C) is from 0.01 g/10 min to less than 10 g/10 min.

[9] The airbag housing cover as described in the above [7] or [8], which contains the component (A) in an amount of 30 wt % or more relative to the total amount of said components (A) to (C).

[10] The airbag housing cover as described in any one of the above [1] to [9], wherein the notched Izod impact strength of said thermoplastic elastomer composition as measured at a temperature of −40° C. in conformity with JIS K7110 is 70 kJ/m$^2$ or more.

[11] The airbag housing cover as described in any one of the above [1] to [10], wherein the tensile strength at break of said thermoplastic elastomer composition as measured at 80° C. by referring to JIS K6251 is 4.0 MPa or more.

Advantageous Effects of Invention

The airbag housing cover of the present invention is excellent in the high-temperature strength and the low-temperature impact resistance. Therefore, the airbag housing cover of the present invention can be suitably used in both a high-temperature environment and a low-temperature environment.

DESCRIPTION OF EMBODIMENTS

The present invention is described in detail below, but the present invention is not limited to the following description and can be implemented by arbitrarily making modifications therein without departing from the gist of the present invention. Here, in the description of the present invention, numerical or physical values expressed by inserting "to" therebetween are used to encompass the values before and after "to". In addition, in the description of the present invention, "mass %" and "parts by mass" have the same meanings as "wt %" and "parts by weight", respectively.

[Airbag Housing Cover]

The airbag housing cover of the present invention contains a thermoplastic elastomer composition which contains the following components (A) and (B) and contains from 10 to 300 parts by weight of the component (B) per 100 parts by weight of the component (A) and in which the melt flow rate at a measurement temperature of 230° C. and a measurement load of 21.18 N is from 5 to 50 g/10 min:

Component (A): a polypropylene-based resin

Component (B): an olefin-based block copolymer containing a polymer block composed of ethylene and an ethylene α-olefin copolymer block.

Incidentally, the "airbag housing cover" as used in the present invention means a container in general for housing an airbag and, for example, in a container having housed therein an airbag, indicates the portion of opening at the time of deployment of the airbag or the entire container integrated with the opening portion.

The airbag housing cover of the present invention has a characteristic feature of being excellent in the low-temperature impact resistance, high-temperature strength, etc., compared with those using the conventional thermoplastic elastomer known, for example, in Patent Documents 1 to 6. In the airbag housing cover of the present invention, the components (A) and (B) make it possible to obtain high-temperature strength and the component (B) can provide for good low-temperature impact resistance.

<Component (A)>

The thermoplastic elastomer composition for use in the present invention contains a polypropylene-based resin of the component (A). By containing the component (A), injection moldability is imparted to the thermoplastic elastomer used in the raw material of the airbag housing cover of the present invention, and the airbag housing cover is provided with effects such as improved high-temperature strength and enhanced rigidity. Incidentally, the "polypropylene-based resin" of the component (A) means a polymer in which the content of the propylene unit as a constituent unit thereof is 90 wt % or more.

The component (A) is a polypropylene-based resin having a propylene unit content of 90 to 100 wt % and may be a propylene homopolymer or a propylene-based copolymer containing, in addition to a propylene unit, an α-olefin unit except for propylene (the "α-olefin" as used herein encompasses ethylene) or a monomer unit except for α-olefin, in an amount of 10 wt % or less. The α-olefin unit except for propylene includes ethylene and an α-olefin having a carbon number of 4 to 20. The α-olefin having a carbon number of 4 to 20 includes 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 4-methyl-1-pentene, 2-ethyl-1-hexene, 2,2,4-trimethyl-1-pentene, etc. As the α-olefin except for propylene, ethylene and an α-olefin having a carbon number of 4 to 10 are preferred, and ethylene, 1-butene, 1-hexene and 1-octene are more preferred.

The polypropylene-based resin of the component (A) includes, for example, a propylene homopolymer, a propylene-ethylene copolymer, a propylene-1-butene copolymer, a propylene-1-hexene copolymer, a propylene-1-octene copolymer, a propylene-ethylene-1-butene copolymer, a propylene-ethylene-1-hexene copolymer, and a propylene-ethylene-1-octene copolymer. A propylene homopolymer and a copolymer of propylene and at least one monomer selected from ethylene and an α-olefin having a carbon number of 4 to 10 are preferred. The polypropylene-based resin of the component (A) may be a polypropylene block copolymer, and among others, in view of low-temperature impact resistance and high-temperature strength, a polypropylene block copolymer obtained by polymerizing a propylene homopolymer in a first step and subsequently polymerizing a propylene-ethylene copolymer in a second step is preferred as the component (A).

The propylene unit content in the component (A) is from 90 to 100 wt %, preferably from 95 to 100 wt %, more preferably from 98 to 100 wt %, relative to the entire component (A). When the propylene unit content in the component (A) is not less than the lower limit above, the heat resistance and rigidity of the airbag housing cover are improved. Here, the propylene unit content in the component (A) can be determined by infrared spectroscopy.

The melt flow rate (measurement temperature: 230° C., measurement load: 21.18 N) of the component (A) is not limited but is usually 0.1 g/min or more and in view of the appearance of the molded body, preferably 10 g/10 min or more, more preferably 20 g/10 min or more, still more preferably 30 g/10 min or more. Also, the melt flow rate (measurement temperature: 230° C., measurement load: 21.18 N) of the component (A) is usually 200 g/10 min or less and in view of tensile strength, preferably 150 g/10 min or less, more preferably 100 g/10 min or less. The melt flow rate of the component (A) is measured under the conditions of a measurement temperature of 230° C. and a measurement load of 21.18 N in conformity with JIS K7210 (1999).

As for the production method of the propylene-based resin of the component (A), a known polymerization method using a known olefin polymerization catalyst is employed. The method includes, for example, a multistage polymerization method using a Ziegler-Natta catalyst. In the multistage polymerization method, a slurry polymerization method, a solution polymerization method, a bulk polymerization method, a gas-phase polymerization method, etc. may be used, and two or more thereof may be used in combination.

In addition, as the component (A) for use in the airbag housing cover of the present invention, a pertinent commercial product may also be used. The commercially available polypropylene-based resin is procurable from the following manufacturers, etc. and may be appropriately selected. The available commercial product includes Prim Polypro (registered trademark) of Prime Polymer Co., Ltd., NOBLEN (registered trademark) of Sumitomo Chemical Co., Ltd., a propylene block copolymer of Sun Allomer Ltd., NOVATEC (registered trademark) PP of Japan Polypropylene Corporation, Moplen (registered trademark) of Lyondell Basell, Exxon Mobil PP of Exxon Mobil, Formolene (registered trademark) of *Formosa* Plastics, *Borealis* PP of *Borealis*, SEETEC PP of LG Chemical, ASI POLYPROPYLENE of A. Schulman, INEOS PP of INEOS Olefins & Polymers, Braskem PP of Braskem, Sumsung Total of SAMSUNG TOTAL PETROCHEMICALS, Sabic (registered trademark) PP of Sabic, TOTAL PETROCHEMICALS Polypropylene of TOTAL PETROCHEMICALS, YUPLENE (registered trademark) of SK, etc.

<Component (B)>

The component (B) constituting the thermoplastic elastomer composition for use in the present invention is an olefin-based block copolymer containing a polymer block composed of ethylene and an ethylene α-olefin copolymer block. It is preferred that the component (B) has a crystal melting peak at 110 to 125° C. and the crystal melting heat quantity at the peak is from 20 to 60 J/g. Here, in the component (B), when the crystal melting heat quantity at the crystal melting peak of 110 to 125° C. is from 20 to 60 J/g, this is an index indicating that the component (B) has a polymer block composed of crystalline ethylene. Furthermore, the component (B) has non-crystallinity based on the ethylene α-olefin copolymer block, in addition to the crystallinity based on the polymer block composed of ethylene. The component (B) has such a structure, whereby effects of high-temperature strength and low-temperature impact resistance are imparted to the airbag housing cover of the present invention. In view of high-temperature strength, the crystal melting heat quantity of the component (B) is preferably 20 J/g or more, more preferably 30 J/g or more. Also, in view of low-temperature impact resistance, the crystal melting heat quantity of the compound (B) is preferably 60 J/g or less, more preferably 50 J/g or less.

The crystalline polymer block in the component (B) is mainly composed of ethylene but may contain another monomer unit, in addition to ethylene. The another monomer unit includes, for example, 1-propylene, 1-butene, 2-methylpropylene, 1-pentene, 3-methyl-1-butene, 1-hexene, 4-methyl-1-pentene, and 1-octene. An α-olefin having a carbon-carbon double bond at a terminal carbon atom and having a carbon number of 3 to 8, such as 1-propylene, 1-butene, 1-hexene and 1-octene, is preferred. In the component (B), only one α-olefin may be copolymerized with ethylene, or two or more α-olefins may be copolymerized with ethylene. As the component (B), only one component may be used, or two or more components may be used in combination.

The ethylene α-olefin copolymer block in the component (B) includes, for example, those having, as a constituent unit, an α-olefin such as 1-propylene, 1-butene, 2-methylpropylene, 1-pentene, 3-methyl-1-butene, 1-hexene, 4-methyl-1-pentene and 1-octene, in addition to an ethylene unit. An α-olefin having a carbon-carbon double bond at a terminal carbon atom and having a carbon number of 4 to 8, such as 1-propylene, 1-butene, 1-hexene and 1-octene, is preferred. In the component (B), only one α-olefin may be copolymerized with ethylene, or two or more α-olefins may be copolymerized with ethylene. As the component (B), only one component may be used, or two or more components may be used in combination.

The ethylene unit content in the component (B) is preferably from 50 to 80 wt % relative to the total amount of the ethylene unit content and the α-olefin unit content. The ethylene unit content in the component (B) is preferably large so as to prevent the component (B) from fusion due to blocking and is preferably small in view of low-temperature impact resistance when the thermoplastic elastomer of the present invention is molded. The ethylene unit content in the component (B) is more preferably 55 wt % or more, still more preferably 60 wt % or more. Also, the ethylene unit content is more preferably 75 wt % or less. Incidentally, each of the content of the ethylene unit and the content of the α-olefin unit having a carbon number of 4 to 8 in the component (B) can be determined by infrared spectroscopy.

The ethylene α-olefin copolymer in the component (B) may contain another monomer unit such as non-conjugated diene-based monomer unit (non-conjugated diene unit), in addition to the ethylene unit and the α-olefin unit having a carbon number of 4 to 8. The non-conjugated diene includes, for example, a chain non-conjugated diene such as 1,4-hexadiene, 1,6-octadiene, 2-methyl-1,5-hexadiene, 6-methyl-1,5-heptadiene and 7-methyl-1,6-octadiene; and a cyclic non-conjugated diene such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene. Preferred are 5-ethylidene-2-norbornene and dicyclopentadiene.

In the case where the component (B) contains another monomer unit such as non-conjugated diene unit, the content thereof is usually 10 wt % or less, preferably 5 wt % or less, relative to the entire component (B). The content of the non-conjugated diene unit or propylene unit can be determined by infrared spectroscopy.

The component (B) for use in the present invention specifically includes, for example, a block copolymer containing a crystalline ethylene polymer block and an ethylene α-olefin copolymer block such as ethylene-1-butene copolymer, ethylene-1-hexene copolymer, ethylene-1-octene copolymer, ethylene-propylene-1-butene copolymer, ethylene-propylene-1-hexene copolymer and ethylene-propylene-1-octene copolymer. One of these block copolymers may be used, or two or more thereof may be used in combination. Among others, the component (B) is most preferably a block copolymer containing an ethylene polymer block and an ethylene-1-octene copolymer block, that is, the component (B) is most preferably an olefin-based block copolymer containing blocks of a polymer composed of ethylene and an ethylene-1-octene copolymer.

The component (B) has non-crystallinity attributable to the ethylene α-olefin copolymer block, in addition to containing a polymer block composed of ethylene having crystallinity. The non-crystallinity is expressed by the glass transition temperature, and the glass transition temperature by DSC method is preferably −80° C. or more, more preferably −75° C. or more, and is preferably −50° C. or less, more preferably −60° C. or less.

The melt flow rate (measurement temperature: 190° C., measurement load: 21.18 N) of the component (B) is not limited but is usually 10 g/10 min or less and in view of the strength, preferably 8 g/10 min or less, more preferably 5 g/10 min or less, still more preferably 3 g/10 min or less. Also, the melt flow rate of the component (B) is usually 0.01 g/10 min or more and in view of flowability, preferably 0.05 g/10 min or more, more preferably 0.10 g/10 min or more. The melt flow rate of the component (B) is measured under the conditions of a measurement temperature of 190° C. and a measurement load of 21.18 N in conformity with ASTM D1238.

The density of the component (B) is, in view of low-temperature impact resistance, preferably 0.88 g/cm$^3$ or less, more preferably 0.87 g/cm$^3$ or less. On the other hand, the lower limit is not particularly limited but is usually 0.85 g/cm$^3$ or more.

As for the production method of the component (B), the polymer can be synthesized according to the methods disclosed in JP-T-2007-529617 (the term "JP-T" as used herein means a published Japanese translation of a PCT patent application), JP-T-2008-537563 and JP-T-2008-543978. For example, the polymer can be produced through a step of preparing a composition containing a mixture or reaction product obtained by combining a first olefin polymer catalyst, a second olefin polymer catalyst capable of preparing a polymer differing in the chemical or physical property from a polymer prepared by the first olefin polymerization catalyst under equivalent polymerization conditions, and a chain shuttling agent, and a step of bringing the above-described ethylene and α-olefin into contact with this composition under addition-polymerization conditions.

A continuous solution polymerization method is preferably applied to the polymerization of the component (B). In the continuous solution polymerization method, a catalyst component, a chain shuttling agent, monomers and depending on the case, a solvent, an adjuvant, a scavenger and a polymerization aid are continuously supplied to a reaction zone, and a polymer product is continuously taken out therefrom. The length of the block can be varied by controlling the ratio and kind of the catalyst, the ratio and kind of the chain shuttling agent, the polymerization temperature, etc.

Other conditions in the synthesis method of a block copolymer are disclosed in JP-T-2007-529617, JP-T-2008-537563 and JP-T-2008-543978. The pertinent commercial product includes, for example, Engage (registered trademark)-XLT series and INFUSE (registered trademark) series produced by The Dow Chemical Company. Incidentally, out of the components (B), those containing an ethylene.octene copolymer block were not available as a product until the commercial production of INFUSE (registered trademark) series and Engage (registered trademark)-XLT series has been started in 2007 and 2011, respectively, by The Dow Chemical Company.

<Component (C)>

The thermoplastic elastomer composition for use in the present invention preferably contains, as the component (C), an amorphous ethylene α-olefin copolymer in which the crystal melting heat quantity at 110 to 125° C. is less than 20 J/g. When in the component (C), the crystal melting heat quantity at 110 to 125° C. is less than 20 J/g, this indicates that the component (C) is low in the crystallinity and is amorphous. By containing the component (C), the low-temperature impact resistance of the thermoplastic elastomer of the present invention can be more successfully improved.

The component (C) is a copolymer containing at least an ethylene unit and an α-olefin unit. The α-olefin used in the component (C) includes, for example, 1-propylene, 1-butene, 2-methylpropylene, 1-pentene, 3-methyl-1-butene, 1-hexene, 4-methyl-1-pentene, and 1-octene. The α-olefin used in the component (C) is preferably an α-olefin having a carbon-carbon double bond at a terminal carbon atom and having a carbon number of 3 to 8, such as 1-propylene, 1-butene, 1-hexene and 1-octene. In the component (C), only one α-olefin may be copolymerized with ethylene, or two or more α-olefins may be copolymerized with ethylene. As the component (C), only one component may be used, or two or more components may be used in combination.

The ethylene unit content in the component (C) is preferably from 50 to 80 wt % relative to the total amount of the ethylene unit content and the α-olefin unit content. The ethylene unit content in the component (C) is preferably large so as to prevent the component (C) from fusion due to blocking and is preferably small in view of low-temperature impact resistance when the thermoplastic elastomer of the present invention is molded. The ethylene unit content in the component (C) is more preferably 55 wt % or more, still more preferably 60 wt % or more. Also, the ethylene unit content is more preferably 75 wt % or less. Incidentally, each of the content of the ethylene unit and the content of the α-olefin unit having a carbon number of 3 to 8 in the component (C) can be determined by infrared spectroscopy.

The amorphous ethylene α-olefin copolymer of the component (C) may contain another monomer unit such as non-conjugated diene-based monomer unit (non-conjugated diene unit), in addition to the ethylene unit and the α-olefin unit having a carbon number of 3 to 8. The non-conjugated diene includes, for example, a chain non-conjugated diene such as 1,4-hexadiene, 1,6-octadiene, 2-methyl-1,5-hexadiene, 6-methyl-1,5-heptadiene and 7-methyl-1,6-octadiene; and a cyclic non-conjugated diene such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene. Preferred are 5-ethylidene-2-norbornene and dicyclopentadiene.

The content of the another monomer unit such as non-conjugated diene unit in the component (C) is usually 10 wt % or less, preferably 5 wt % or less, relative to the entire component (C). The content of the non-conjugated diene unit or propylene unit can be determined by infrared spectroscopy.

The component (C) for use in the present invention specifically includes, for example, an ethylene-1-butene copolymer rubber, an ethylene-1-hexene copolymer rubber, an ethylene-1-octene copolymer rubber, an ethylene-propylene-1-butene copolymer rubber, an ethylene-propylene-1-hexene copolymer rubber, and an ethylene-propylene-1-octene copolymer rubber. One of these may be used, or two or more thereof may be used in combination. Among others, an ethylene-1-butene copolymer rubber and an ethylene-1-octene copolymer rubber are preferred.

The melt flow rate (measurement temperature: 190° C., measurement load: 21.18 N) of the component (C) is not limited but is usually less than 10 g/10 min and in view of the strength, preferably 8 g/10 min or less, more preferably 5 g/10 min or less, still more preferably 3 g/10 min or less. Also, the melt flow rate of the component (C) is usually 0.01 g/10 min or more and in view of flowability, preferably 0.05 g/10 min or more, more preferably 0.10 g/10 min or more. The melt flow rate of the component (C) is measured under the conditions of a measurement temperature of 190° C. and a measurement load of 21.18 N in conformity with ASTM D1238.

The density of the component (C) is, in view of low-temperature impact resistance, preferably 0.88 g/cm$^3$ or less, more preferably 0.87 g/cm$^3$ or less. On the other hand, the lower limit is not particularly limited but is 0.85 g/cm$^3$ or more.

As for the production method of the component (C), a known polymerization method using a known olefin polymerization catalyst is employed. For example, a Ziegler-Natta catalyst or a complex-based catalyst such as metallocene-based complex and non-metallocene-based complex, can be used as the olefin polymerization catalyst, and the polymerization method includes a slurry polymerization method, a solution polymerization method, a bulk polymerization method, a gas-phase polymerization method, etc. A pertinent commercial product may also be used. The pertinent commercial product includes, for example, Engage (registered trademark) series produced by The Dow Chemical Company, and TAFMER (registered trademark) series produced by Mitsui Chemicals Inc.

<Blending Amount>

The content of the component (B) is, in view of low-temperature impact resistance of the molded body, 10 parts by weight or more, preferably 30 parts by weight or more, more preferably 50 parts by weight or more, still more preferably 60 parts by weight or more, per 100 parts by weight of the component (A). The content of the component (B) is, in view of rigidity of the molded body, 300 parts by weight or less, preferably 200 parts by weight or less, more preferably 150 parts by weight or less, still more preferably 120 parts by weight or less, per 100 parts by weight of the component (A).

The content of the component (C) is, in view of low-temperature impact resistance of the molded body, preferably 10 parts by weight or more, more preferably 30 parts by weight or more, still more preferably 50 parts by weight or more, yet still more preferably 60 parts by weight or more, per 100 parts by weight of the component (A). The content of the component (C) is, in view of rigidity of the molded body, preferably 300 parts by weight or less, more preferably 200 parts by weight or less, still more preferably 150 parts by weight or less, yet still more preferably 120 parts by weight or less, per 100 parts by weight of the component (A).

In the thermoplastic elastomer composition for use in the present invention, in view of airbag deployment performance at a high temperature, the component (A) is preferably contained in an amount of 30 wt % or more, more preferably 40 wt % or more, still more preferably 45 wt % or more, relative to the total amount of the components (A) to (C). On the other hand, in view of low-temperature impact resistance, the component (A) is preferably contained in an amount of 70 wt % or less, more preferably 65 wt % or less, still more preferably 60 wt % or less, relative to the total amount of the components (A) to (C).

Furthermore, in view of airbag deployment performance at a low temperature and a high temperature, the component (B) is preferably contained in an amount of 15 wt % or more relative to the total amount of the components (A) to (C) and from the standpoint of increasing this effect, more preferably contained in an amount of 30 wt % or more, still more preferably in an amount of 40 wt % or more. On the other hand, in view of injection moldability, the component (B) is preferably contained in an amount of 70 wt % or less, more preferably 65 wt % or less, still more preferably 60 wt % or less, relative to the total amount of the components (A) to (C).

<Other Components>

In the thermoplastic elastomer composition for use in the present invention, in addition to the above-described components, an arbitrary component, e.g., the following additives and the resins other than the components (A) to (C) (hereinafter, referred to "other resins"), may be blended according to various purposes as long as the effects of the present invention are not seriously impaired.

The arbitrary component includes various additives such as coloring agent, antioxidant, heat stabilizer, light stabilizer, ultraviolet absorber, neutralizing agent, lubricant, antifogging agent, anti-blocking agent, slip agent, flame retardant, dispersant, antistatic agent, electrical conductivity-imparting agent, metal inactivator, molecular weight regulator, fungicide and fluorescent whitener. For example, an antioxidant is used in the range of 0.01 to 0.5 parts by weight per 100 parts by weight of the total amount of the components (A) to (C).

Other resins that can be contained in the thermoplastic elastomer composition for use in the present invention include a styrene-based thermoplastic elastomer, a polyester resin, a polyamide resin, a styrene resin, an acrylic resin, a polycarbonate resin, a polyvinyl chloride resin, various elastomers other than those described above, etc. The composition may contain only one of other resins above or may contain two or more thereof. In the case of using a styrene-based thermoplastic elastomer, it is preferable to further use a softening agent for hydrocarbon-based rubber.

<Production Method of Thermoplastic Elastomer Composition>

The thermoplastic elastomer composition for use in the present invention can be produced by kneading the components (A) and (B), the component (C), if desired, and/or other components with use of a normal extruder, a Banbury mixer, a roll, Brabender Plastograph, a Brabender kneader, etc. Among these production methods, it is preferable to use an extruder, in particular, a twin-screw extruder. At the time of production of the thermoplastic elastomer composition of the present invention by the kneading in an extruder, etc., the components are melt-kneaded in a heated state usually at 160 to 240° C., preferably at 180 to 220° C., whereby the composition can be produced. Furthermore, the thermoplastic elastomer composition of the present invention may be partially crosslinked by blending the following crosslinking agent or crosslinking aid therewith and dynamically heat-treating the mixture.

As the crosslinking agent for partially crosslinking the thermoplastic elastomer composition for use in the present invention, an organic peroxide is preferably used, and examples thereof include 2,5-dimethyl-2,5-di(tert-butylperoxy)hexane, 2,5-dimethyl-2,5-di(tert-butylperoxy)hexine-3, 1,3-bis(tert-butylperoxyisopropyl)benzene, 1,1-di(tert-butylperoxy)-3,5,5-trimethylcyclohexane, 2,5-dimethyl-2,5-di (peroxybenzoyl)hexine-3, and dicumyl peroxide.

The crosslinking aid used when partially crosslinking the composition by the organic peroxide above includes, for example, a compound such as N,N'-m-phenylenebismaleimide and toluylene bismaleimide; a compound having a radical polymerizable carbon-carbon double bond, such as p-quinonedioxime, nitrobenzene, diphenylguanidine, trimethylolpropane, divinylbenzene, ethylene glycol dimethacrylate, polyethylene glycol dimethacrylate, trimethylolpropane trimethacrylate and allyl methacrylate; and a compound having a functional group capable of reacting with the linear carbon chain moiety of the component (B) and/or the component (C).

<Physical Properties>

The thermoplastic elastomer composition for use in the present invention is excellent in the injection moldability, high-temperature strength, low-temperature impact resistance, etc. by virtue of containing specific amounts of the components (A) and (B).

In the present invention, the melt flow rate (MFR) at a temperature of 230° C. and a measurement load of 21.18 N in conformity with JIS K7210 (1999) is employed as an indicator of the injection moldability of the thermoplastic elastomer composition. The thermoplastic elastomer composition for use in the present invention needs to have a melt flow rate of 5 to 50 g/10 min so as to exhibit excellent injection moldability. If MFR is less than 5 g/10 min, the thermoplastic elastomer composition lacks flowability and is unsuited for injection molding, and if it exceeds 50 g/10 min, this may give rise to burr, etc. at the time of injection molding. In view of flowability, the melt flow rate is preferably 7 g/10 min or more, more preferably 10 g/10 min or more. On the other hand, from the standpoint of reducing burr, etc. at the time of injection molding, MFR of the thermoplastic elastomer composition is preferably 40 g/10 min or less, more preferably 30 g/10 min or less, still more preferably 20 g/10 min or less. Incidentally, MFR of the thermoplastic elastomer for use in the present invention tends to be higher with a larger content of the component (A) that is a component having high flowability, and tends to be lower with a larger content of the component (B) having low flowability. In the case of containing the component (C), MFR of the thermoplastic elastomer composition tends to be lower with a larger content of the component (C).

In the present invention, the Izod impact strength at −40° C. according to JIS K7110 (1999) is employed as an indicator of the low-temperature impact resistance. Therefore, the Izod impact strength is preferably 70 kJ/m$^2$ or more, more preferably 80 kJ/m$^2$ or more, still more preferably 90 kJ/m$^2$ or more. On the other hand, the upper limit of the Izod impact strength of the thermoplastic elastomer composition for use in the present invention is not particularly limited but is usually 150 kJ/m$^2$ or less.

The thermoplastic elastomer composition for use in the present invention is, in view of high-temperature strength, preferably a composition having physical properties where the tensile strength at break as measured at 80° C. by referring to JIS K6251 (1993) is 4.0 MPa or more, more preferably 4.5 MPa or more, still more preferably 5.0 MPa or more. In the case of using a composition in which the tensile strength at break at 80° C. is less than the range above, the high-temperature strength is poor and therefore, the high-temperature deployability of the airbag housing cover tends to be deteriorated. In this connection, the present invention has a characteristic feature of being excellent in the high-temperature strength while maintaining the low-temperature impact resistance, as compared with the conventional thermoplastic elastomer composition used for an airbag housing cover. For this reason, it is particularly important in the present invention to increase the high-temperature strength.

The thermoplastic elastomer composition above is generally molded using an ordinary injection molding method or, if desired, various molding methods such as gas injection molding method, injection compression molding method and short-shot foam-molding method, whereby the composition can be used as an airbag housing cover. Among others, the airbag housing cover of the present invention is preferably produced by injection molding, and the molding conditions at the time of injection molding are as follows. The molding temperature when injection-molding the airbag housing cover is generally from 150 to 300° C., preferably from 180 to 280° C. The injection pressure is usually from 5 to 100 MPa, preferably from 10 to 80 MPa. The mold temperature is usually from 0 to 80° C., preferably from 20 to 60° C. The airbag housing cover obtained in this way is suitably used as an airbag housing cover of an airbag system that is actuated by sensing an impact or deformation upon collision accident, etc. of a high-speed moving body such as automobile and protects the occupant by the inflation and deployment.

EXAMPLES

The contents of the present invention are described in greater detail below by referring to Examples, but the present invention is not limited to these Examples as long as its gist is observed. The values of various production conditions or evaluation results in the following Examples have a meaning as a preferable upper or lower limit in the embodiment of the present invention, and the preferable range may be a range defined by the combination of the above-described upper or lower limit value and the value in the following Examples or of the values in Examples.

<Raw Materials>
Component (A) (Polypropylene-Based Resin):
(a-1): A Polypropylene Block Copolymer (a Polymer Obtained by Polymerizing a Propylene Homopolymer in a First Step and Subsequently Polymerizing an Ethylene-Propylene Copolymer in a Second Step)

MFR (JIS K7210 (1999): 60 g/10 min (measurement conditions: 230° C. and a load of 21.18 N (2.16 kgf)); in the polypropylene block copolymer, propylene homopolymer content: 92 wt %, ethylene-propylene copolymer content: 8 wt %; in the ethylene propylene copolymer, ethylene unit content: 43 wt %; melting temperature: 163° C.

Component (B) (Olefin-Based Block Copolymer):
(b-1): XLT8677 Produced by the Dow Chemical Company (a Polymer Having a Crystalline Polymer Block Composed of Ethylene and an Ethylene Octene Copolymer Block)

Crystal melting peak: 119° C., crystal melting heat quantity: 37 J/g, MFR (ASTM D1238): 1.3 g/10 min (measurement conditions: 230° C. and a load of 21.18 N (2.16 kgf)) (catalogue value), density: 0.87 g/cm$^3$, glass transition temperature (DSC method): −67° C.

Component (C) (Amorphous Ethylene α-Olefin Copolymer):
(c-1): TAFMER (Registered Trademark) A05505 (Ethylene-Butene Copolymer) Produced by Mitsui Chemicals Inc.

Crystal melting peak: no peak at 110 to 125° C., crystal melting heat quantity: 0, MFR (ASTM D1238): 0.5 g/10 min (measurement conditions: 190° C. and a load of 21.18 N (2.16 kgf)) (catalogue value), density: 0.86 g/cm$^3$.

(c-2): Engage (Registered Trademark) 8180 (Ethylene-Octene Copolymer) Produced by the Dow Chemical Company Crystal melting peak: no peak at 110 to 125° C., crystal melting heat quantity: 0, MFR (ASTM D1238): 0.5 g/10 min (measurement conditions: 190° C. and a load of 21.18 N (2.16 kgf)) (catalogue value), density: 0.86 g/cm$^3$.

(c-3): Engage (Registered Trademark) 8100 (Ethylene-Octene Copolymer) Produced by the Dow Chemical Company Crystal melting peak: no peak at 110 to 125° C., crystal melting heat quantity: 0, MFR (ASTM D1238): 1.0 g/10 min (measurement conditions: 190° C. and a load of 21.18 N (2.16 kgf)) (catalogue value), density: 0.87 g/cm$^3$.

<Evaluation Methods>
1) Injection Moldability: Melt Flow Rate (Unit: g/10 Min)

The melt flow rate was measured under the conditions of a temperature of 230° C. and a load of 21.18 N in conformity with JIS K7210 (1999).

2) Low-Temperature Impact Resistance: Izod Impact Strength (Unit: kJ/m$^2$)

Using an in-line screw type injection molding machine ("IS130" manufactured by Toshiba Machine Co., Ltd.), a test piece for Izod impact strength was molded into a notched specimen of 4 mm (thickness)×12.7 mm (width)×64 mm (length) at an injection pressure of 50 MPa, a cylinder temperature of 220° C. and a mold temperature of 40° C. The specimen was measured at a temperature of −40° C. in conformity with JIS K7110 (1999). As the Izod impact strength is larger, the specimen was judged more excellent in the low-temperature impact strength.

3) High-Temperature Strength: Tensile Fracture Test (No. JIS-3 Dumbbell, Tensile Speed: 500 mm/min)

Using an in-line screw type injection molding machine ("IS130" manufactured by Toshiba Machine Co., Ltd.), a test piece for a tensile test was molded into a sheet (2 mm (thickness)×120 mm (width)×80 mm (length)) at an injection pressure of 50 MPa, a cylinder temperature of 220° C. and a mold temperature of 40° C., and the sheet was stamped out in conformity with JIS K6251 (1993) (No. JIS-3). The tensile strength at break (unit: MPa) and tensile elongation at break (unit: %) were measured in an atmosphere of 80° C. by referring to JIS K6251 (1993). As each value of the tensile strength at break and the tensile elongation at break is larger, the sheet was judged more excellent in the high-temperature strength.

Examples/Comparative Examples

Example 1

100 wt % of (a-1), 110 wt % of (b-1) and 0.1 parts by weight of an antioxidant (trade name: Irganox (registered trademark) 1010, produced by BASF Japan) were blended for 1 minute in a Henschel mixer, charged into a same-direction twin-screw extrude ("TEX30α", manufactured by Kobe Steel, Ltd., L/D=45, number of cylinder block=13) at a rate of 20 kg/h and after raising the temperature in the range of 180 to 210° C., melt-kneaded to produce a pellet of a thermoplastic elastomer composition. The obtained pellet of a thermoplastic elastomer composition was evaluated for 1) to 3) above. These evaluation results are shown in Table 1.

Examples 2 to 4 and Comparative Examples 1 to 6

Pellets of thermoplastic elastomer compositions for an airbag housing cover were obtained in the same manner as in Example 1 except for employing the formulations shown in Table 1. In addition, 1) to 3) above were evaluated in the same manner as in Example 1. These evaluation results are shown in Table 1.

is insufficient. In Comparative Example 2 where in Example 2, the component (B) of the present invention was not used but the component (C) was used instead, it is seen that the low-temperature impact resistance is insufficient. In Comparative Example 5 where in Example 3, the component (B) of the present invention was not used but the component (C) was used instead, it is seen that the low-temperature impact resistance is insufficient. In Comparative Example 6 where in Example 4, the component (B) of the present invention was not used but the component (C) was used instead, it is seen that the high-temperature strength is insufficient. Furthermore, in Comparative Example 3 where the amount of the component (B) used was decreased, the low-temperature impact resistance is bad. In Comparative Example 4 where the amount of the component (B) used was increased, the high-temperature strength is bad.

While the invention has been described in detail and with reference to specific embodiments thereof, it will be apparent to one skilled in the art that various changes and modifications can be made therein without departing from the spirit and scope thereof. This application is based on a Japanese patent application filed on Sep. 19, 2012 (Application No. 2012-206110), the content thereof being incorporated herein by reference.

The airbag housing cover of the present invention is excellent in the low-temperature impact resistance, the high-temperature strength, etc. and is very useful as an airbag housing cover.

The invention claimed is:

1. An airbag housing cover containing a thermoplastic elastomer composition which contains the following components (A) and (B) and contains from 10 to 300 parts by weight of the component (B) per 100 parts by weight of the component (A) and in which the melt flow rate at a measurement temperature of 230° C. and a measurement load of 21.18 N is from 5 to 50 g/10 min:

Component (A): a polypropylene-based resin

TABLE 1

| | | | | Example | | | | Comparative Example | | | | | |
|---|---|---|---|---|---|---|---|---|---|---|---|---|---|
| | | | | 1 | 2 | 3 | 4 | 1 | 2 | 3 | 4 | 5 | 6 |
| Raw Material | Component (A) | a-1 | parts by weight | 100 | 100 | 100 | 100 | 100 | 100 | 100 | 100 | 100 | 100 |
| | Component (B) | b-1 | parts by weight | 110 | 35 | 80 | 120 | — | — | 5 | 400 | — | — |
| | Component (C) | c-1 | parts by weight | — | 45 | — | — | — | 45 | — | — | — | — |
| | | c-2 | weight | — | — | — | — | 110 | — | — | — | 80 | 120 |
| | | c-3 | | — | — | — | — | — | 35 | — | — | — | — |
| Evaluation | Injection moldability | MFR | g/10 min | 12 | 17 | 15 | 10 | 12 | 17 | 56 | 2 | 17 | 12 |
| | Low-temperature impact resistance | Izod Impact strength | kJ/m² | 115 | 93 | 91 | 116 | 114 | 67 | 3.2 | 90 | 31 | 108 |
| | High-temperature strength | Tensile strength at break | MPa | 5.0 | 6.2 | 6.8 | 4.8 | 3.7 | 5.2 | 17.6 | 1.5 | 4.8 | 3.5 |

*In the Table, "—" indicates that the raw material was not used.

*In the Table, "-" indicates that the raw material was not used.
[Results of Evaluation]

In all of Examples 1 to 4 of the present invention, it is seen that the low-temperature impact resistance and the high-temperature strength are excellent. On the other hand, in Comparative Example 1 where in Example 1, the component (B) of the present invention was not used but the component (C) was used instead, it is seen that the high-temperature strength Component (B): an olefin-based block copolymer containing a polymer block composed of ethylene and an ethylene α-olefin copolymer block.

2. The airbag housing cover as claimed in claim 1, wherein said component (B) is an olefin-based block copolymer having a crystal melting peak at 110 to 125° C. and the crystal melting heat quantity at the peak is from 20 to 60 J/g.

3. The airbag housing cover as claimed in claim 1, wherein the carbon number of the α-olefin in the ethylene α-olefin copolymer block of said component (B) is from 4 to 8.

4. The airbag housing cover as claimed in claim 1, wherein said component (B) is an olefin-based block copolymer containing a polymer block composed of ethylene and an ethylene-1-octene copolymer block.

5. The airbag housing cover as claimed in claim 1, wherein said component (A) is a polypropylene block copolymer obtained by polymerizing a propylene homopolymer in a first step and subsequently polymerizing a propylene-ethylene copolymer in a second step.

6. The airbag housing cover as claimed in claim 1, wherein the melt flow rate (measurement temperature: 230° C., measurement load: 21.18 N) of said component (A) is from 10 to 150 g/10 min.

7. The airbag housing cover as claimed in claim 2, which further contains the following component (C) and contains from 10 to 300 parts by weight of the component (C) per 100 parts by weight of said component (A):
   Component (C): an amorphous ethylene α-olefin copolymer whose crystal melting heat quantity at 110 to 125° C. is less than 20 J/g.

8. The airbag housing cover as claimed in claim 7, wherein the melt flow rate (measurement temperature: 230° C., measurement load: 21.18 N) of said component (A) is from 10 to 100 g/10 min and the melt flow rate (measurement temperature: 190° C., measurement load: 21.18 N) of said component (C) is from 0.01 g/10 min to less than 10 g/10 min.

9. The airbag housing cover as claimed in claim 7, which contains the component (A) in an amount of 30 wt % or more relative to the total amount of said components (A) to (C).

10. The airbag housing cover as claimed in claim 1, wherein the notched Izod impact strength of said thermoplastic elastomer composition as measured at a temperature of −40° C. in conformity with JIS K7110 is 70 kJ/m$^2$ or more.

11. The airbag housing cover as claimed in claim 1, wherein the tensile strength at break of said thermoplastic elastomer composition as measured at 80° C. by referring to JIS K6251 is 4.0 MPa or more.

12. The airbag housing cover as claimed in claim 2, wherein the carbon number of the α-olefin in the ethylene α-olefin copolymer block of said component (B) is from 4 to 8.

13. The airbag housing cover as claimed in claim 2, wherein said component (B) is an olefin-based block copolymer containing a polymer block composed of ethylene and an ethylene-1-octene copolymer block.

14. The airbag housing cover as claimed in claim 2, wherein said component (A) is a polypropylene block copolymer obtained by polymerizing a propylene homopolymer in a first step and subsequently polymerizing a propylene-ethylene copolymer in a second step.

15. The airbag housing cover as claimed in claim 2, wherein the melt flow rate (measurement temperature: 230° C., measurement load: 21.18 N) of said component (A) is from 10 to 150 g/10 min.

* * * * *